United States Patent
Zhang

(10) Patent No.: US 11,553,444 B2
(45) Date of Patent: *Jan. 10, 2023

(54) METHOD, NETWORK APPARATUS, AND TERMINAL APPARATUS FOR INDICATING POSITION OF SYNCHRONIZATION SIGNAL BLOCK

(71) Applicant: GUANGDONG OPPO MOBILE TELECOMMUNICATIONS CORP., LTD., Guangdong (CN)

(72) Inventor: Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 4 days.

This patent is subject to a terminal disclaimer.

(21) Appl. No.: 17/166,719

(22) Filed: Feb. 3, 2021

(65) Prior Publication Data
US 2021/0160796 A1 May 27, 2021

Related U.S. Application Data

(63) Continuation of application No. 16/791,685, filed on Feb. 14, 2020, now Pat. No. 10,966,169, which is a (Continued)

(51) Int. Cl.
*H04W 56/00* (2009.01)
*H04L 1/16* (2006.01)
(Continued)

(52) U.S. Cl.
CPC ......... *H04W 56/001* (2013.01); *H04L 1/1614* (2013.01); *H04W 24/10* (2013.01); *H04W 92/10* (2013.01)

(58) Field of Classification Search
CPC ... H04W 56/001; H04W 24/10; H04W 92/10; H04L 1/1614
(Continued)

(56) References Cited

U.S. PATENT DOCUMENTS

2015/0358848 A1  12/2015  Kim et al.
2018/0302819 A1* 10/2018  Lee .................. H04B 7/0632

FOREIGN PATENT DOCUMENTS

| RU | 2629557 | 8/2017 |
|---|---|---|
| WO | 2016047512 | 3/2016 |
| WO | 2017076317 | 5/2017 |

OTHER PUBLICATIONS

EPO, Office Action for EP Application No. 17924389.4, dated Nov. 19, 2021.
(Continued)

*Primary Examiner* — Obaidul Huq
(74) *Attorney, Agent, or Firm* — Hodgson Russ LLP

(57) ABSTRACT

Disclosed in the present invention are a method, network apparatus, terminal apparatus, and computer storage medium for indicating a position of a synchronization signal block. The method comprises: determining a transmission position of a synchronization signal block of at least one cell of a first type; and sending to a terminal apparatus, by means of signaling, the transmission position of the synchronization signal block of the at least one cell of the first type, wherein the terminal apparatus is covered by a cell of a second type managed by the network apparatus.

16 Claims, 3 Drawing Sheets

Determine a transmission position of a synchronization signal block of at least one cell of a first type — 101

Send to a terminal apparatus, by means of signaling, the transmission position of the synchronization signal block of the at least one cell of the first type — 102

Related U.S. Application Data continuation of application No. PCT/CN2017/101143, filed on Sep. 8, 2017.

(51) Int. Cl.
*H04W 24/10* (2009.01)
*H04W 92/10* (2009.01)

(58) Field of Classification Search
USPC ........................................ 370/310, 328, 329
See application file for complete search history.

(56) References Cited

OTHER PUBLICATIONS

INAPI, Office Action for CL Application No. 2020-000571, dated Sep. 21, 2021.
FIPS, First Office Action of RU Application No. 2020113015, dated Jan. 26, 2021.
INAPI, Resolution of Notification of the Expert Response issued in CL Application No. 2020-000571, dated Mar. 9, 2022.
JPO, Decision of Refusal issued in JP Application No. 2020-513598, dated Feb. 15, 2022.
IPI, Office Action for IN Application No. 202017002965, dated May 31, 2021.
EPO, Communication for EP Application No. 17924389.4, dated May 3, 2021.
Nokia et al., "On SS Burst Set composition," 3GPP TSG-RAN WG1#90, R1-1714005, Aug. 2017, 5 pages.
ISDEC, Office Action for CA Application No. 3075196, dated Apr. 23, 2021.
JPO, Office Action for JP Application No. 2020-513598, dated Jun. 22, 2021.
KIPO, Office Action for KR Application No. 10-2020-7006954, dated May 24, 2021.
ILPO, English translation of the Office Action for IL Application No. 273053, dated Sep. 19, 2022.
IPA, Office Action for AU Application No. 2017430541, dated Oct. 26, 2022.
INAPI, Office Action for CL Office Action No. 202000571, dated Nov. 8, 2022.

* cited by examiner

METHOD, NETWORK APPARATUS, AND TERMINAL APPARATUS FOR INDICATING POSITION OF SYNCHRONIZATION SIGNAL BLOCK

CROSS-REFERENCE TO RELATED APPLICATION

This application is a continuation of U.S. patent application Ser. No. 16/791,685, filed Feb. 14, 2020, which is a continuation of International Application No. PCT/CN2017/101143, filed Sep. 8, 2017, the entire disclosures of which are incorporated herein by reference.

TECHNICAL FIELD

The present disclosure relates to the field of information processing technology, and more particularly, to a method for indicating a position of a synchronous signal block, a network apparatus, a terminal apparatus, and a computer storage medium.

BACKGROUND

The synchronous channels in the LTE system are PSS and SSS signals, and the reference signal for a terminal to measure RRM is a CRS or CSI-RS signal. In a 5G NR system design, 3GPP has reached a conclusion that a network apparatus sends an SS burst set containing a plurality of SS blocks to the terminal, and each SS block includes PSS, SSS, and PBCH. Based on the implementation of the base station, each SS block may correspond to one downlink beam. The terminal searches for the SS block in the system bandwidth to acquire time-frequency synchronization and PBCH information, and performs RRM measurement based on the SSS and the DMRS of the PBCH.

At present, 3GPP has also reached a conclusion that a SS block position for actual transmission in one SS burst set may be notified to the terminal via a broadcast signaling RMSI by a serving cell of the terminal in a manner of bitmap.

However, the processing method of the existing technology mentioned above is only for the current cell to obtain the synchronous signal, and it cannot further guarantee to reduce the terminal measurement time and power consumption of the terminal apparatus.

SUMMARY

The embodiments of the present disclosure provides a method for indicating a position of a synchronous signal block, a network apparatus, a terminal apparatus, and a computer storage medium.

The embodiments of the present disclosure provide a method for indicating a position of a synchronous signal block, applied to a network apparatus, including:

determining a transmission position of a synchronous signal block of at least one first type of cell; and sending, by a signaling, the transmission position of the synchronous signal block of the at least one first type of cell to a terminal apparatus; wherein the terminal apparatus is located within a range of a second type of cell managed by the network apparatus.

The embodiments of the present disclosure provide a method for indicating a position of a synchronous signal block, applied to a terminal apparatus, including:

receiving a transmission position of a synchronous signal block of at least one first type of cell sent by a network apparatus via a signaling; and measuring, the synchronous signal block of at least one first type of cell based on the transmission position of the synchronous signal block of at least one first type of cell.

The embodiments of the present disclosure provide a network apparatus, including:

a processing unit, configured to determine a transmission position of a synchronous signal block of at least one first type of cell; and control to send the transmission position of the synchronous signal block of at least one first type of cell to a terminal apparatus by a signaling; wherein, the terminal apparatus is located within a range of a second type of cell managed by the network apparatus; and a communication unit, configured to send the signaling to the terminal apparatus.

The embodiments of the present disclosure provide a terminal apparatus, including:

an information receiving unit, configured to receive a transmission position of the synchronous signal block of at least one first type of cell sent by a network apparatus via a signaling; and a measuring unit, configured to measure, the synchronous signal block of at least one first type of cell based on the transmission position of the synchronous signal block of at least one first type of cell.

The embodiments of the present disclosure provide a network apparatus, including: a processor and a memory for storing a computer program executable on the processor, wherein, when executing the computer programs, the processor performs the steps of the foregoing method.

The embodiments of the present disclosure provide a terminal apparatus, including: a processor and a memory for storing a computer program executable on the processor, wherein, when executing the computer program, the processor performs the steps of the foregoing method.

The embodiments of the present disclosure provide a computer storage medium for storing computer executable instructions, wherein when the computer executable instructions are executed, the steps of the foregoing method is performed.

In the technical solutions of the embodiments of the present disclosure, the transmission position of the synchronous signal block of the first type of cell is sent to the terminal apparatus, so as to guarantee that the terminal apparatus can directly measure the neighboring cell at a time corresponding to the notified transmission position of the synchronous signal block of the first type of cell, without performing measurement at other positions, thereby saving terminal measurement time and power consumption overhead.

DETAILED DESCRIPTION

In order to have a more detailed understanding of the characteristic and technical contents of the embodiments of the present disclosure, the implementation of the embodiments of the present disclosure will be described below with reference to the drawings. The accompanying drawings are for reference only, rather than limiting the embodiments of the present disclosure.

First Embodiment

Figure 1:
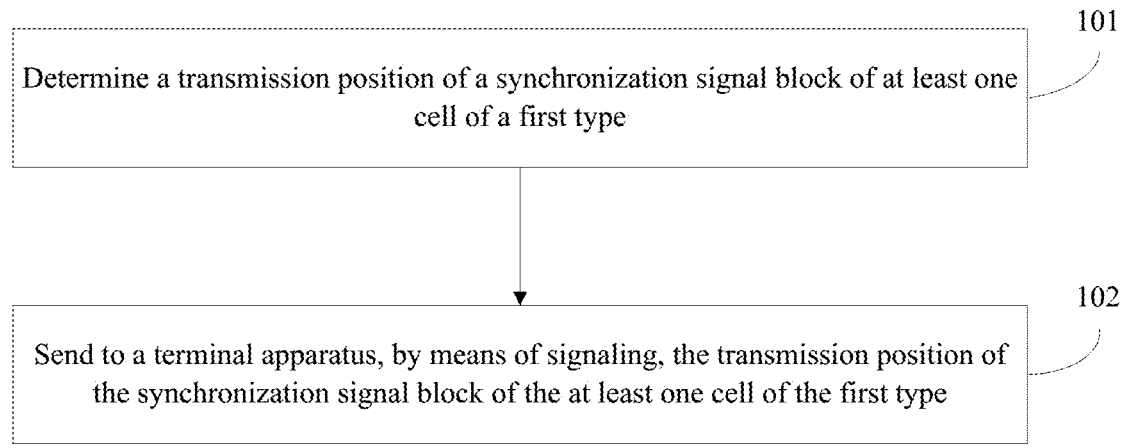
FIG. 1 is a first schematic flowchart showing a method for indicating a position of a synchronous signal block according to an embodiment of the present disclosure.

This embodiment provides a method for indicating a position of a synchronous signal block. As shown in FIG. 1, the method includes the following steps.

In step 101, a transmission position of a synchronous signal block of at least one first type of cell is determined.

In step 102, the transmission position of the synchronous signal block of the at least one first type of cell is sent to a terminal apparatus by a signaling, the terminal apparatus being located within a range of a second type of cell managed by the network apparatus.

Here, the network apparatus may be a base station, for example, may be an eNB, a gNB, or other apparatus. Alternatively, the network apparatus may be other network apparatus, as long as the apparatus can provide a function of accessing the mobile communication network for the terminal apparatus.

It should be further noted that the first type of cell refers to a cell adjacent to the cell where the terminal apparatus is located, which may be a neighboring cell.

In addition, it should be understood that, the terminal apparatus being within the cell managed by the network apparatus may be that the terminal apparatus is located in one of a plurality of cells managed by the network apparatus.

For a non-carrier aggregation (CA) scenario, the cell in which the terminal apparatus is located may be referred to as a second type of cell, and the second type of cell may also be referred to as a serving cell of the terminal apparatus. In this embodiment, the second type of cell in which the terminal is located and the first type of cell (that is, the neighboring cell) may be cells managed by the same network apparatus, and may also be cells managed by different network apparatuses.

For a CA scenario, a Primary cell (i.e., P cell) in the cell in which the terminal apparatus is located may be referred to as a second type of cell; other cells except the P cell (including an S cell having the terminal apparatus, that is, the secondary cell) are all classified into the first type of cell. In the scenario, the second type of cell in which the terminal is located and the first type of cell (that is, the neighboring cell) may be cells managed by the same network apparatus, and may also be cells managed by different network apparatuses.

In the above step 101, the manners for the network apparatus to determine the transmission position of the actual synchronous signal block (SS block) of other cells adjacent to the network apparatus may include the followings.

In a first manner, the transmission position of the synchronous signal block of at least one first type of cell is acquired by an X2 interface or an S1 interface. (In the present embodiment, the first type of cell being a neighboring cell is taken as an example for subsequent description)

Specifically, the network apparatus may query the base station apparatus of other cells adjacent to itself by the S1 interface and the X2 interface, and the base station apparatus of other cells notifies the actual transmission position of the SS block of other cells to the network apparatus by the X2 interface and the S1 interface.

The querying and notifying process may be performed periodically. The period needs to be smaller than a period in which the base station apparatus updates the actual transmission position of the SS block.

It should be noted that, this manner is more suitable for the scenario where the first type of cell and the cell in which the terminal apparatus is located are managed by different network apparatuses.

In a second manner, a broadcast message sent by a network apparatus corresponding to at least one first type of cell is acquired; and a transmission position of a synchronous signal block of at least one first type of cell is acquired from the broadcast message.

The network apparatus acquires the transmission position of an actual SS block of other cells adjacent to the network apparatus by receiving and reading the broadcast message of other cells adjacent to the network apparatus.

Specifically, since the network apparatus may notify the actual SS block transmission position of the local cell by the broadcast message RMSI, the network apparatus may periodically read the broadcast message of other cells adjacent to the network apparatus and obtain the actual transmission position of the SS block of the neighboring cell.

It should be noted that, this manner is more suitable for the scenario where the first type of cell and the cell where the terminal apparatus is located are managed by different network apparatuses.

In addition to the above two manners, for the scenario in which the cell in which the terminal device is located and the first type of cell (that is, the neighboring cell) are both managed by the same network apparatus, the method for acquiring the transmission position of the synchronous signal block of the neighboring cell may be directly acquired from the cell management information of the network apparatus, which will not elaborated here.

In step 102, the transmitting, by the signaling, the transmission position of the synchronous signal block of the at least one first type of cell to the terminal apparatus, includes:

generating a bitmap based on the transmission position of the synchronous signal block of the at least one first type of cell, and transmitting the bitmap to the terminal apparatus by the signaling.

The method for sending the bitmap to the terminal apparatus may be: the network apparatus notifies the terminal, by a broadcast signaling, the actual transmission position of the SS block of other cells;

or, the network apparatus notifies the terminal, by a RRC dedicated signaling, the actual transmission position of the SS block of other cells.

The generating the bitmap based on the transmission position of the synchronous signal block of the at least one first type of cell, and transmitting the bitmap to the terminal apparatus by signaling, includes:

when the first type of cell is in a synchronous state with the cell managed by the network apparatus, generating the bitmap of the transmission position(s) of the synchronous signal block(s) including all the first type of cell(s) based on transmission position(s) of the synchronous signal block(s) of all the first type of cell(s); and transmitting, by the signaling, the bitmap including the transmission position(s) of the synchronous signal block(s) of all the first type of cell(s) to the terminal apparatus.

That is, the network apparatus aggregates the transmission positions of the synchronous signal blocks of all neighboring cells into one bitmap, and notifies the actual transmission position of the SS block of other cells in the form of a bitmap. That is, the bitmap contains the complete set of actual SS block positions of all other cells needing to notify.

Figure 2:
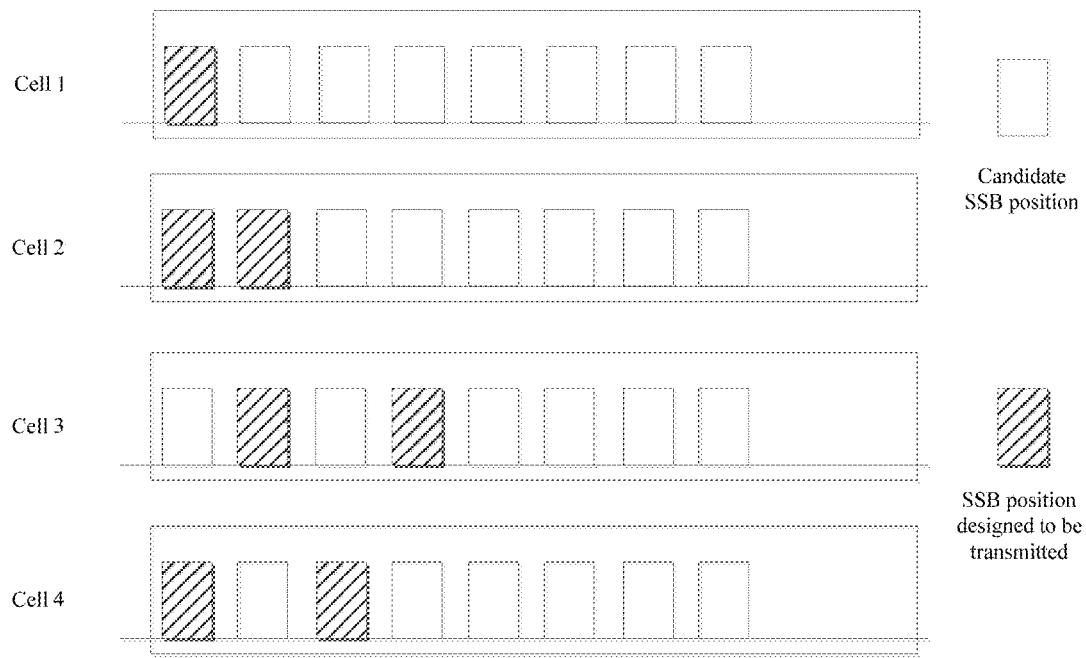
FIG. 2 is a first schematic diagram showing a scenario of an embodiment of the present disclosure.

For example, referring to FIG. 2, a network apparatus and a terminal operate in a frequency band of 3-6 GHz, and one SS burst set may transmit up to eight SS blocks. Based on the actual deployment requirement and specific implementation of the network, the numbers of the SS blocks transmitted by different base station apparatuses are shown in FIG. 2.

For example, cell 1, cell 2, cell 3, and 4 are mutually neighboring cells, the SS block position actually transmitted by cell 1 is the first position of 8 candidate SS block positions, and cell 2 corresponds to the first and second positions; cell 3 corresponds to the second and four positions; and cell 4 corresponds to the first and third positions.

For cell 1, cell 2, cell 3 and cell 4 are neighboring cells, and cell 2, cell 3 and cell 4 use the first, second, third, and fourth SS block positions, when cell 1 uses a bitmap to notify the actual transmission position of the SS block of the neighboring cell of cell 1 to the UE served by cell 1, the bitmap is: "11110000", where "1" indicates that the SS block is transmitted at this candidate position, and "0" indicates that the SS block is not transmitted at this candidate position.

For cell 3, cell 1, cell 2 and cell 4 are neighboring cells, and cells 1, 2 and 4 use the first, second, and third SS block positions, when cell 3 uses a bitmap to notify the actual transmission position of the SS block of the neighboring cell of cell 3 to the UE served by cell 3, the bitmap is: "11100000", where "1" indicates that the SS block is transmitted at this candidate position, and "0" indicates that the SS block is not transmitted at this candidate position.

For cell 4, cell 1, cell 2 and cell 3 are neighboring cells, and cell 1, cell 2 and cell 3 use the first, second, and fourth SS block positions, when cell 4 uses a bitmap to notify the actual transmission position of the SS block of the neighboring cell of cell 4 to the UE served by cell 4, the bitmap is: "11010000", where "1" indicates that the SS block is transmitted at this candidate position, and "0" indicates that the SS block is not transmitted at this candidate position.

The network apparatus notifies the actual transmission position of the SS block of each of other cells to be measured in the form of one bitmap.

Based on the foregoing scheme, the method may further include: transmitting, to the terminal apparatus, a synchronous relationship between the at least one first type of cell and the cell managed by the network apparatus;

wherein, the synchronous relationship includes: the first type of cell is in a synchronous state with the cell managed by the network apparatus; or, there is a synchronous deviation between the first type of cell and the cell managed by the network apparatus.

That is, while the network apparatus notifies the terminal of the actual transmission position of the SS block of other cells by a signaling, the network apparatus notifies the terminal of the synchronous relationship between other cells and the local cell corresponding to the network apparatus, that is, the synchronous state or the synchronous deviation.

The synchronous state includes: notifying, by the network apparatus, that the local cell corresponding to the network apparatus is in a synchronous state with other neighboring cells, to the terminal.

Correspondingly, when the terminal performs measurement, if the local cell and the neighboring cell are synchronous, the terminal may determine the actual position of the SS block transmitted by the neighboring cell. The terminal directly acquires the actual position of the SS block of the neighboring cell based on the timing of the local cell.

Different from the foregoing synchronous situation, when there is a synchronous deviation between the local cell and the neighboring cell, the following manner may be adopted:

when there is a synchronous deviation between the at least one first type of cell and the cell managed by the network apparatus, sending, to the terminal apparatus, the synchronous deviation between at least one first type of cell and the cell managed by the network apparatus;

generating a bitmap corresponding to each of the neighboring cell(s) based on the transmission position of the synchronous signal block of the at least one first type of cell; and transmitting, by the signaling, the bitmap corresponding to each of the first type of cell to the terminal apparatus.

The network apparatus notifies the terminal of the synchronous deviation between other cells and the local cell corresponding to the network apparatus. Correspondingly, when the terminal performs measurement, if the local cell and the neighboring cell are not synchronous, the terminal may determine the actual position of the SS block transmitted by the neighboring cell based on the notification information and the deviation of the timings between the cells. The terminal directly acquires the actual position of the SS block of the neighboring cell to be measured based on the timing of the local cell and the timing deviation of the neighboring cell to be measured.

Figure 3:
FIG. 3 is a second schematic diagram showing a scenario of an embodiment of the present disclosure.

For example, as shown in FIG. 3, cell 1 and cell 3 are synchronous, cell 2 is 0.5 ms backward offset from cell 1 and cell 3, then the first candidate SS block position of cell 2 corresponds to the second candidate SS block position of cell 2; and cell 4 is 1 ms backward offset from cell 1 and cell 3, then the first candidate SS block position of cell 4 corresponds to the third candidate SS block position of cell 1.

For example, cell 1 notifies the terminal of the time deviations between cell 2, cell 3, cell 4 and cell 1 respectively, and the terminal combines the actual SS block transmission position of each of the cell 2, cell 3 and cell 4, and then may determine the reception time of actual transmission SS block of each cell.

In addition, the present embodiment may also provide a processing manner for a scenario in which a part of the neighboring cells is synchronous with the local cell and the other part of the neighboring cells is not synchronous with the local cell:

if there is a synchronous deviation between a first part of the first type of cell in the at least one first type of cell and the cell managed by the network apparatus, and a second part of the first type of cell in the first type of cell is in the synchronous state with the cell managed by the network apparatus; wherein, the first part of the first type of cell is different from the second part of the first type of cell, and the first part of the first type of cell and the second part of the first type of cell form all the neighboring cells;

then transmitting, to the terminal apparatus, the synchronous deviation between the first part of the first type of cell and the cell managed by the network apparatus; generating a bitmap corresponding to each of the first type of cell in the first part of first type of cell based on the transmission position of the synchronous signal block of the first part of the first type of cell; transmitting, by the signaling, the bitmap corresponding to each of the first type of cell in the first type of cell to the terminal apparatus;

and, generating, the bitmap including the transmission position of the synchronous signal block of the second part of the first type of cell according to the transmission position of the synchronous signal block of the second part of the first type of cell; and transmitting, to the terminal apparatus, the bitmap including the transmission position of the synchronous signal block of the second part of the first type of cell.

For example, in four neighboring cells, the synchronous relationship between the neighboring cells 1, 2 and the local cell is synchronous, and there is a deviation between the neighboring cells 3, 4 and the local cell; then, the transmission positions of the synchronous signal blocks of the neighboring cells 1 and 2 are all set in the bitmap and transmitted to the terminal apparatus; and the synchronous deviation of the neighboring cells 3 and 4, the bitmap of the transmission position of the synchronous signal block of the neighboring cell 3, and the bitmap of the transmission position of the synchronous signal block of the neighboring cell 4 are all transmitted to the terminal apparatus.

There is also a processing manner in this embodiment, that is, no matter whether there is a synchronous deviation between the neighboring cell and the local cell, the synchronous deviation of the neighboring cell and the bitmap of the transmission position of the synchronous signal block of the neighboring cell are transmitted to the terminal apparatus.

That is, the synchronous deviation between each of the at least one first type of cell and the cell managed by the network apparatus is transmitted to the terminal apparatus;

a bitmap corresponding to each of the first type of cell is generated based on the transmission position of the synchronous signal block of the at least one first type of cell; and the bitmap corresponding to each of the first type of cell is transmitted to the terminal apparatus by the signaling.

In this scenario, the synchronous deviation of the neighboring cell synchronized with the local cell is equal to 0.

Finally, it should be noted that, in this embodiment, the synchronous deviation of a certain neighboring cell and the bitmap corresponding to a certain neighboring cell may be sent simultaneously or sequentially, which is not limited herein.

It can be seen that by adopting the above scheme, the transmission position of the synchronous signal block of the neighboring cell can be transmitted to the terminal apparatus, thereby ensuring that the terminal apparatus can directly measure the neighboring cell at a moment corresponding to the notified transmission position of the synchronous signal block of the first type of cell, without performing measurement at other positions, thereby saving terminal measurement time and power consumption.

Second Embodiment

Figure 4:
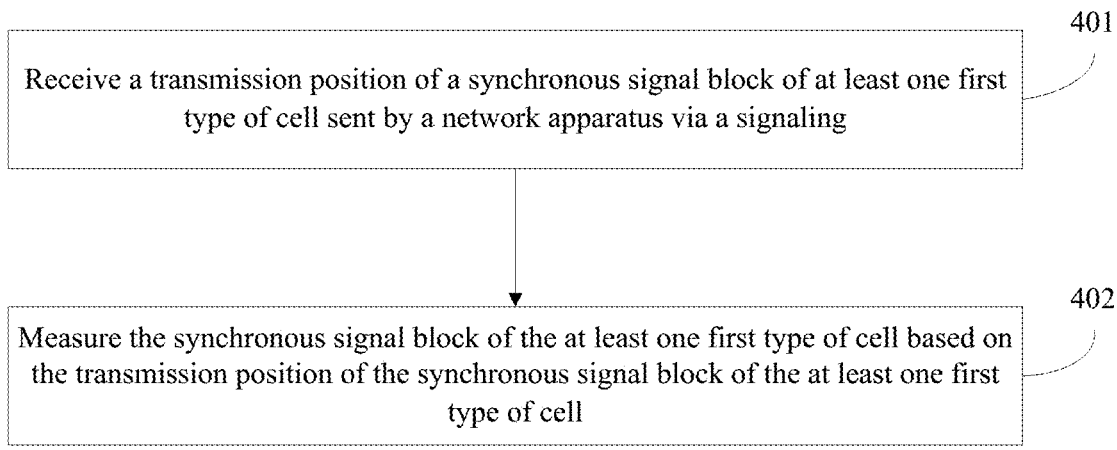
FIG. 4 is a second schematic flowchart showing a method for indicating a position of a synchronous signal block according to an embodiment of the present disclosure.

This embodiment provides a method for indicating a position of a synchronous signal block, applied to a terminal apparatus. As shown in FIG. 4, the method includes the following steps.

In step 401, a transmission position of a synchronous signal block of at least one first type of cell sent by a network apparatus via a signaling is received.

In step 402, the synchronous signal block of the at least one first type of cell is measured based on the transmission position of the synchronous signal block of the at least one first type of cell.

Here, the network apparatus may be a base station, for example, may be an eNB, a gNB, or other apparatus. Alternatively, the network apparatus may be other network apparatus, as long as the apparatus can provide a function of accessing the mobile communication network for the terminal apparatus.

For a non-carrier aggregation (CA) scenario, the cell in which the terminal apparatus is located may be referred to as a second type of cell, and the second type of cell may also be referred to as a serving cell of the terminal apparatus. In this embodiment, the second type of cell in which the terminal is located and the first type of cell (that is, the neighboring cell) may be cells managed by the same network apparatus, and may also be cells managed by different network apparatuses.

For a CA scenario, a Primary cell (i.e., P cell) in the cell in which the terminal apparatus is located may be referred to as a second type of cell; other cells except the P cell (including an S cell having the terminal apparatus, that is, the secondary cell) are all classified into the first type of cell. In the scenario, the second type of cell in which the terminal is located and the first type of cell (that is, the neighboring cell) may be cells managed by the same network apparatus, and may also be cells managed by different network apparatuses.

The receiving the transmission position of the synchronous signal block of the at least one first type of cell sent by the network apparatus via the signaling, includes:

receiving the signaling from the network apparatus; and acquiring a bitmap from the signaling, and acquiring, by the bitmap, the transmission position of the synchronous signal block of at least one first type of cell.

The method for transmitting the bitmap to the terminal apparatus may be: the network apparatus notifies the terminal, by a broadcast signaling, the actual transmission position of the SS block of other cells;

or, the network apparatus notifies the terminal, by a RRC dedicated signaling, the actual transmission position of the SS block of other cells.

The method further includes:

receiving a synchronous relationship between the at least one first type of cell sent by the network apparatus and the cell managed by the network apparatus;

wherein, the synchronous relationship includes: the first type of cell is in a synchronous state with the cell managed by the network apparatus; or, there is a synchronous deviation between the first type of cell and the cell managed by the network apparatus.

The acquiring the bitmap from the signaling, and acquiring, by the bitmap, the transmission position of the synchronous signal block of the at least one first type of cell, includes:

when there is a synchronous deviation between the first type of cell and the cell managed by the network apparatus, acquiring, from the bitmap, the transmission position(s) of the synchronous signal block(s) of all the first type of cell(s).

That is, the network apparatus aggregates the transmission position(s) of the synchronous signal block(s) of all neighboring cell(s) into one bitmap, and notifies the actual transmission position(s) of the SS block(s) of other cell(s) in the form of one bitmap. That is, the bitmap contains the complete set of actual SS block positions of all other cells that need to notify.

For example, referring to FIG. 2, a network apparatus and a terminal operate in a frequency band of 3-6 GHz, and one SS burst set may transmit up to eight SS blocks. Based on the actual deployment requirement and specific implementation of the network, the numbers of SS blocks transmitted by different base station apparatuses are shown in FIG. 2.

For example, cell 1, cell 2, cell 3, and cell 4 are mutually neighboring cells, the SS block position actually transmitted by cell 1 is the first position of 8 candidate SS block positions, and cell 2 corresponds to the first and second positions; cell 3 corresponds to the second and fourth positions; and cell 4 corresponds to the first and third positions.

For cell 1, cell 2, cell 3 and cell 4 are neighboring cells, and cell 2, cell 3 and cell 4 use the first, second, third, and fourth SS block positions, when cell 1 uses a bitmap to notify the actual transmission position of the SS block of the neighboring cell of cell 1 to the UE served by cell 1, the bitmap is: "11110000", where "1" indicates that the SS block is transmitted at this candidate position, and "0" indicates that the SS block is not transmitted at this candidate position.

For cell 3, cell 1, cell 2 and cell 4 are neighboring cells, and cells 1, 2 and 4 use the first, second, and third SS block positions, when cell 3 uses a bitmap to notify the actual transmission position of the SS block of the neighboring cell of cell 3 to the UE served by cell 3, the bitmap is: "11100000", where "1" indicates that the SS block is transmitted at this candidate position, and "0" indicates that the SS block is not transmitted at this candidate position.

For cell 4, cell 1, cell 2 and cell 3 are neighboring cells, and cell 1, cell 2 and cell 3 use the first, second, and fourth SS block positions, when cell 4 uses a bitmap to notify the actual transmission position of the SS block of the neighboring cell of cell 4 to the UE served by cell 4, the bitmap is: "11010000", where "1" indicates that the SS block is transmitted at this candidate position, and "0" indicates that the SS block is not transmitted at this candidate position.

The network apparatus notifies the actual transmission position of the SS block of each of other cells to be measured in the form of one bitmap.

When the terminal performs measurement, if the local cell and the neighboring cell are synchronous, the terminal may determine the actual position of the SS block transmitted by the neighboring cell. The terminal directly acquires the actual position of the SS block of the neighboring cell based on the timing of the local cell.

Different from the foregoing synchronous situation, when there is a synchronous deviation between the local cell and the neighboring cell, the following manner may be adopted:

when there is a synchronous deviation between the at least one first type of cell and the cell managed by the network apparatus, acquiring, the synchronous deviation between the at least one first type of cell and the cell managed by the network apparatus; and acquiring, a bitmap corresponding to each of the first type of cell, and acquiring the transmission position of the synchronous signal block of each of the first type of cell based on the bitmap.

First of all, the network apparatus notifies the terminal of the synchronous deviation between other cell(s) and the local cell corresponding to the network apparatus. Correspondingly, when the terminal performs measurement, if the local cell and the neighboring cell are not synchronous, the terminal may determine the actual position of the SS block transmitted by the neighboring cell based on the notification information and the deviation of the timings between the cells. The terminal directly acquires the actual position of the SS block of the neighboring cell to be measured based on the timing of the local cell and the timing deviation of the neighboring cell to be measured.

For example, as shown in FIG. 3, cell 1 and cell 3 are synchronous, cell 2 is 0.5 ms backward offset from cell 1 and cell 3, then the first candidate SS block position of cell 2 corresponds to the second candidate SS block position of cell 2; and cell 4 is 1 ms backward offset from cell 1 and cell 3, then the first candidate SS block position of cell 4 corresponds to the third candidate SS block position of cell 1.

For example, cell 1 notifies the terminal of the time deviation of cell 2, cell 3, cell 4 and cell 1 respectively, the terminal combines the actual SS block transmission position of each of the cell 2, 3 and 4, and then the terminal may determine the reception time of actual transmission SS block of each cell.

In addition, the present embodiment may also provide a processing manner for a scenario in which a part of the neighboring cells is synchronous with the local cell and the other part of the neighboring cells is not synchronous with the local cell:

if there is a synchronous deviation between a first part of the first type of cell in at least one first type of cell and the cell managed by the network apparatus, and a second part of the first type of cell in the first type of cell is in the synchronous state with the cell managed by the network apparatus; wherein, the first part of the first type of cell is different from the second part of the first type of cell, and the first part of the first type of cell and the second part of the first type of cell form all the first type of cell;

then acquiring the transmission position of the synchronous signal block of the first part of the first type of cell based on the bitmap of each first type of cell in the first part of the first type of cell;

and, acquiring, according to the bitmap of the second part of the first type of cell, the transmission position of the synchronous signal block of the second part of the first type of cell.

For example, in four neighboring cells, the synchronous relationship between the neighboring cells 1, 2 and the local cell is synchronous, and the neighboring cells 3 and 4 have a deviation; then, the transmission positions of the synchronous signal blocks of the neighboring cells 1 and 2 are all set in the bitmap and transmitted to the terminal apparatus; the synchronous deviation of the neighboring cells 3 and 4, and the bitmap of the transmission position of the synchronous signal block of the neighboring cell 3, and the bitmap of the transmission position of the synchronous signal block of the neighboring cell 4 are all transmitted to the terminal apparatus. Correspondingly, the terminal apparatus performs measurement on the neighboring cells 1 and 2 based on the bitmap of the transmission position of the synchronous signal block including the neighboring cells 1 and 2; and then, based on the synchronous deviation of the neighboring cells 3 and 4 and the respective bitmaps, perform the measurement at the transmission positions of the synchronous signal blocks of the neighboring cells 3 and 4 respectively.

There is also a processing manner in the present embodiment, that is, no matter whether there is a synchronous deviation between the neighboring cell and the local cell, the synchronous deviation of the neighboring cell and the bitmap of the transmission position of the synchronous signal block of the neighboring cell are transmitted to the terminal apparatus.

That is, the synchronous deviation between each of the at least one first type of cell and the cell managed by the network apparatus is transmitted to the terminal apparatus;

the bitmap corresponding to each of the first type of cell is acquired, and the transmission position of the synchronous signal block of each of the first type of cell is acquired from the bitmap.

In this scenario, the synchronous deviation of the neighboring cell synchronized with the local cell is equal to 0.

Finally, it should be noted that, in this embodiment, the synchronous deviation of a certain neighboring cell and the bitmap corresponding to a certain neighboring cell may be sent simultaneously or sequentially, which is not limited herein.

It can be seen that by adopting the above scheme, the transmission position of the synchronous signal block of the neighboring cell can be transmitted to the terminal apparatus, thereby ensuring that the terminal apparatus can directly measure the neighboring cell at a moment corresponding to the notified transmission position of the synchronous signal block of the first type of cell, without performing measurement at other positions, thereby saving terminal measurement time and power consumption.

Third Embodiment

Figure 5:
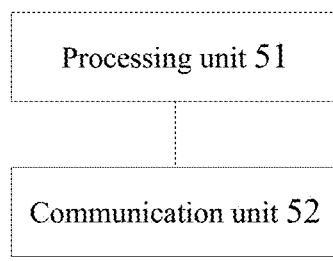
FIG. 5 is a schematic block diagram showing a structure of a network apparatus according to an embodiment of the present disclosure.

This embodiment provides a network apparatus. As shown in FIG. 5, the network apparatus includes: a processing unit 51 and a communication unit 52.

The processing unit 51 is configured to determine a transmission position of a synchronous signal block of at least one first type of cell; and control to send the transmission position of the synchronous signal block of the at least one first type of cell to a terminal apparatus by a signaling; wherein, the terminal apparatus is located within a range of second type of cell managed by the network apparatus.

The communication unit 52 is configured to send the signaling to the terminal apparatus.

Here, the network apparatus may be a base station, for example, may be an eNB, a gNB, or other apparatus. Alternatively, the network apparatus may be other network apparatus, as long as the apparatus can provide a function of accessing the mobile communication network for the terminal apparatus.

It should be further noted that the first type of cell refers to a cell adjacent to the cell where the terminal apparatus is located, which may be a neighboring cell.

In addition, it should be understood that, the terminal apparatus being within the cell managed by the network apparatus, may be that the terminal apparatus is located in one of a plurality of cells managed by the network apparatus.

For a non-carrier aggregation (CA) scenario, the cell in which the terminal apparatus is located may be referred to as a second type of cell, and the second type of cell may also be referred to as a serving cell of the terminal apparatus. In the embodiment, the second type of cell in which the terminal is located and the first type of cell (that is, the neighboring cell) may be cells managed by the same network apparatus, and may also be cells managed by different network apparatuses.

For a CA scenario, a Primary Cell (i.e., P cell) in the cell in which the terminal apparatus is located may be referred to as a second type of cell; and other cells except the P cell (including an S cell having the terminal apparatus, that is, the secondary cell) are all classified into the first type of cell. In the scenario, the second type of cell in which the terminal is located and the first type of cell (that is, the neighboring cell) may be cells managed by the same network apparatus, and may also be cells managed by different network apparatuses.

The manners for the network apparatus to determine the transmission position of the actual synchronous signal block (SS block) of other cells adjacent to the network apparatus may include the followings.

In a first manner, the processing unit 51 is configured to acquire the transmission position of the synchronous signal block of at least one first type of cell by an X2 interface or an S1 interface. (In the present embodiment, the first type of cell being a neighboring cell is taken as an example for subsequent description)

Specifically, the network apparatus may query the base station apparatus of other cells adjacent to itself by the S1 interface and the X2 interface, and the base station apparatus of other cells notifies the actual transmission position of the SS block of other cells to the network apparatus by the X2 interface and the S1 interface.

The above querying and notifying process may be performed periodically. The period needs to be smaller than a period in which the base station apparatus updates the actual transmission position of the SS block.

It should be noted that, this manner is more suitable for the scenario where the first type of cell and the cell in which the terminal apparatus is located are managed by different network apparatuses.

In a second manner, the processing unit 51 is configured to acquire a broadcast message sent by a network apparatus corresponding to at least one first type of cell; and acquire a transmission position of a synchronous signal block of at least one first type of cell is from the broadcast message.

The network apparatus acquires the actual transmission position of the SS block of other cells adjacent to the network apparatus by receiving and reading the broadcast message of other cells adjacent to the network apparatus.

Specifically, since the network apparatus may notify the actual SS block transmission position of the local cell by the broadcast message RMSI, the network apparatus may periodically read the broadcast message of other cells adjacent to the network apparatus and obtain the actual transmission position of the SS block of the neighboring cell.

It should be noted that, this manner is more suitable for the scenario where the first type of cell and the cell where the terminal apparatus is located are managed by different network apparatuses.

In addition to the above two manners, for the scenario in which the cell in which the terminal device is located and the first type of cell (that is, the neighboring cell) are both managed by the same network apparatus, the method for acquiring the transmission position of the synchronous signal block of the neighboring cell may be directly acquired from the cell management information of the network apparatus, which will not be elaborated here.

The processing unit 51 is configured to generate a bitmap based on the transmission position of the synchronous signal block of the at least one first type of cell, and transmit the bitmap to the terminal apparatus by the signaling.

The method for sending the bitmap to the terminal apparatus may be: the network apparatus notifies the terminal, by a broadcast signaling, the actual transmission position of the SS block of other cells;

or, the network apparatus notifies the terminal, by a RRC dedicated signaling, the actual transmission position of the SS block of other cells.

The processing unit 51 is configured to, when the first type of cell is in a synchronous state with the cell managed by the network apparatus, generate the bitmap of the transmission position(s) of the synchronous signal block(s) including all the first type of cell(s) based on transmission position(s) of the synchronous signal block(s) of all the first type of cell(s); and transmit, by the signaling, the bitmap including the transmission position(s) of the synchronous signal block(s) of all the first type of cell(s) to the terminal apparatus.

That is, the network apparatus aggregates the transmission positions of the synchronous signal blocks of all neighboring cells into one bitmap, and notifies the actual transmission position of the SS block of other cells in the form of a bitmap. That is, the bitmap contains the complete set of actual SS block positions of all other cells needing to notify.

For example, referring to FIG. 2, a network apparatus and a terminal operate in a frequency band of 3-6 GHz, and one SS burst set may transmit up to eight SS blocks. Based on the actual deployment requirement and specific implementation of the network, the numbers of the SS blocks transmitted by different base station apparatuses are shown in FIG. 2.

For example, cell 1, cell 2, cell 3, and cell 4 are mutually neighboring cells, the SS block position actually transmitted by cell 1 is the first position of 8 candidate SS block positions, and cell 2 corresponds to the first and second positions; cell 3 corresponds to the second and fourth positions; and cell 4 corresponds to the first and third positions.

For cell 1, cell 2, cell 3 and cell 4 are neighboring cells, and cell 2, cell 3 and cell 4 use the first, second, third, and fourth SS block positions, when cell 1 uses a bitmap to notify the actual transmission position of the SS block of the neighboring cell of cell 1 to the UE served by cell 1, the bitmap is: "11110000", where "1" indicates that the SS block is transmitted at this candidate position, and "0" indicates that the SS block is not transmitted at this candidate position.

For cell 3, cell 1, cell 2 and cell 4 are neighboring cells, and cells 1, 2 and 4 use the first, second, and third SS block positions, when cell 3 uses a bitmap to notify the actual transmission position of the SS block of the neighboring cell of cell 3 to the UE served by cell 3, the bitmap is: "11100000", where "1" indicates that the SS block is transmitted at this candidate position, and "0" indicates that the SS block is not transmitted at this candidate position.

For cell 4, cell 1, cell 2 and cell 3 are neighboring cells, and cells 1, 2 and 3 use the first, second, and fourth SS block positions, when cell 4 uses a bitmap to notify the actual transmission position of the SS block of the neighboring cell of cell 4 to UE served by cell 4, the bitmap is: "11010000", where "1" indicates that the SS block is transmitted at this candidate position, and "0" indicates that the SS block is not transmitted at this candidate position.

The network apparatus notifies the actual transmission position of the SS block of each of other cells to be measured in the form of one bitmap.

Based on the foregoing scheme, the method may further include: transmitting, to the terminal apparatus, a synchronous relationship between the at least one first type of cell and the cell managed by the network apparatus;

wherein, the synchronous relationship includes: the first type of cell is in a synchronous state with the cell managed by the network apparatus; or, there is a synchronous deviation between the first type of cell and the cell managed by the network apparatus.

That is, while the network apparatus notifies the terminal of the actual transmission position of the SS block of other cells by a signaling, the network apparatus notifies the terminal of the synchronous relationship between other cells and the local cell corresponding to the network apparatus, that is, the synchronous state or the synchronous deviation.

The synchronous state includes: notifying, by the network apparatus, that the local cell corresponding to the network apparatus is in a synchronous state with other neighboring cell(s), to the terminal.

Correspondingly, when the terminal performs measurement, if the local cell and the neighboring cell are synchronous, the terminal may determine the actual position of the SS block transmitted by the neighboring cell. The terminal directly acquires the actual position of the SS block of the neighboring cell based on the timing of the local cell.

Different from the foregoing synchronous situation, when there is a synchronous deviation between the local cell and the neighboring cell, the following manner may be adopted.

The processing unit 51 is configured to send, when there is a synchronous deviation between the first type of cell and the cell managed by the network apparatus, to the terminal apparatus, the synchronous deviation between at least one first type of cell and the cell managed by the network apparatus;

generate a bitmap corresponding to each of the neighboring first type of cell(s) based on the transmission position of the synchronous signal block of the at least one first type of cell; and transmit, by the signaling, the bitmap corresponding to each of the first type of cell to the terminal apparatus.

First of all, the network apparatus notifies the terminal of the synchronous deviation between other cells and the local cell corresponding to the network apparatus. Correspondingly, when the terminal performs measurement, if the local cell and the neighboring cell are not synchronous, the terminal may determine the actual position of the SS block transmitted by the neighboring cell based on the notification information and the deviation of the timings between the cells. The terminal directly acquires the actual position of the SS block of the neighboring cell to be measured based on the timing of the local cell and the timing deviation of the neighboring cell to be measured.

For example, as shown in FIG. 3, cell 1 and cell 3 are synchronous, cell 2 is 0.5 ms backward offset from cell 1 and cell 3, then the first candidate SS block position of cell 2 corresponds to the second candidate SS block position of cell 1; and cell 4 is 1 ms backward offset from cell 1 and cell 3, then the first candidate SS block position of cell 4 corresponds to the third candidate SS block position of cell 1.

For example, cell 1 notifies the terminal of the time deviations between cell 2, cell 3, cell 4 and cell 1 respectively, and the terminal combines the actual SS block transmission position of each of the cell 2, cell 3 and cell 4, and then may determine the reception time of actual transmission SS block of each cell.

In addition, the present embodiment may also provide a processing manner for a scenario in which part of neighboring cells is synchronous with the local cell and the other part of the neighboring cells is not synchronous with the local cell:

if there is a synchronous deviation between a first part of the first type of cell in the at least one first type of cell and the cell managed by the network apparatus, and a second part of the first type of cell in the first type of cell is in the synchronous state with the cell managed by the network apparatus; wherein, the first part of the first type of cell is different from the second part of the first type of cell, and the first part of the first type of cell and the second part of the first type of cell form all the first type of cells; and then transmitting, to the terminal apparatus, the synchronous deviation between the first part of the first type of cell and the cell managed by the network apparatus; generating a bitmap corresponding to each of the first type of cell in the first part of first type of cell based on the transmission position of the synchronous signal block of the first part of the first type of cell; transmitting, by the signaling, a bitmap corresponding to each of the first type of cell in the first type of cell to the terminal apparatus;

and, generating, the bitmap including the transmission position of the synchronous signal block of the second part of the first type of cell according to the transmission position of the synchronous signal block of the second part of the first type of cell; and transmitting, to the terminal apparatus, the bitmap including the transmission position of the synchronous signal block of the second part of the first type of cell.

For example, in four neighboring cells, the synchronous relationship between the neighboring cells 1, 2 and the local cell is synchronous, and there is a deviation between the neighboring cells 3, 4 and the local cell; then, the transmission positions of the synchronous signal blocks of the neighboring cells 1 and 2 are all set in the bitmap and transmitted to the terminal apparatus; and the synchronous deviation of the neighboring cells 3 and 4, the bitmap of the transmission position of the synchronous signal block of the neighboring cell 3, and the bitmap of the transmission position of the synchronous signal block of the neighboring cell 4 are all transmitted to the terminal apparatus.

There is also a processing manner in the embodiment, that is, no matter whether there is a synchronous deviation between the neighboring cell and the local cell, the synchronous deviation of the neighboring cell and the bitmap of the transmission position of the synchronous signal block of the neighboring cell are transmitted to the terminal apparatus.

That is, the processing unit 51 is configured to transmit the synchronous deviation between each of the at least one first type of cell and the cell managed by the network apparatus to the terminal apparatus;

generate a bitmap corresponding to each of the first type of cell based on the transmission position of the synchronous signal block of the at least one first type of cell; and transmit the bitmap corresponding to each of the first type of cell to the terminal apparatus by the signaling.

In this scenario, the synchronous deviation of the neighboring cell synchronized with the local cell is equal to 0.

Finally, it should be noted that, in this embodiment, the synchronous deviation of a certain neighboring cell and the bitmap corresponding to a certain neighboring cell may be transmitted simultaneously or sequentially, which is not limited herein.

It can be seen that by adopting the above scheme, the transmission position of the synchronous signal block of the neighboring cell can be transmitted to the terminal apparatus, thereby ensuring that the terminal apparatus can directly measure the neighboring cell at a moment corresponding to the notified transmission position of the synchronous signal block of the notified first type of cell, without performing measurement at other positions, thereby saving terminal measurement time and power consumption.

Fourth Embodiment

Figure 6:
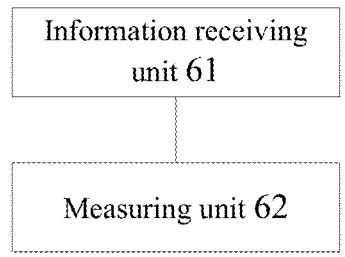
FIG. 6 is a schematic block diagram showing a structure of a terminal apparatus according to an embodiment of the present disclosure.

This embodiment provides a terminal apparatus. As shown in FIG. 6, the apparatus includes: an information receiving unit 61 and a measuring unit 62.

The information receiving unit 61 is configured to receive a transmission position of the synchronous signal block of at least one first type of cell sent by a network apparatus via a signaling.

The measuring unit 62 is configured to measure the synchronous signal block of the at least one first type of cell based on the transmission position of the synchronous signal block of the at least one first type of cell.

Here, the network apparatus may be a base station, for example, may be an eNB, a gNB, or other apparatus. Alternatively, the network apparatus may be other network apparatus, as long as the apparatus can provide a function of accessing the mobile communication network for the terminal apparatus.

For a non-carrier aggregation (CA) scenario, the cell in which the terminal apparatus is located may be referred to as a second type of cell, and the second type of cell may also be referred to as a serving cell of the terminal apparatus. In this embodiment, the second type of cell in which the terminal is located and the first type of cell (that is, the neighboring cell) may be cells managed by the same network apparatus, and may also be cells managed by different network apparatuses.

For a CA scenario, a Primary cell (i.e., P cell) in the cell in which the terminal apparatus is located may be referred to as a second type of cell; other cells except the P cell (including an S cell having the terminal apparatus, that is, the secondary cell) are all classified into the first type of cell. In the scenario, the second type of cell in which the terminal is located and the first type of cell (that is, the neighboring cell) may be cells managed by the same network apparatus, and may also be cells managed by different network apparatuses.

The information receiving unit is configured to receive the signaling from the network apparatus.

Accordingly, the measuring unit is configured to acquire a bitmap from the signaling, and acquire, by the bitmap, the transmission position of the synchronous signal block of at least one first type of cell.

The method for transmitting the bitmap to the terminal apparatus may be: the network apparatus notifies the terminal, by a broadcast signaling, the actual transmission position of the SS block of other cells;

or, the network apparatus notifies the terminal, by a RRC dedicated signaling, the actual transmission position of the SS block of other cells.

The information receiving unit 61 is configured to receive a synchronous relationship between the at least one first type of cell sent by the network apparatus and the cell managed by the network apparatus;

wherein, the synchronous relationship includes: the first type of cell is in a synchronous state with the cell managed by the network apparatus; or, there is a synchronous deviation between the first type of cell and the cell managed by the network apparatus.

The measuring unit 62 is configured to, when there is a synchronous deviation between the first type of cell and the cell managed by the network apparatus, acquire from the bitmap, the transmission position(s) of the synchronous signal block(s) of all the first type of cell(s).

That is, the network apparatus aggregates the transmission position(s) of the synchronous signal block(s) of all neighboring cell(s) into one bitmap, and notifies the actual transmission position(s) of the SS block(s) of other cell(s) in the form of one bitmap. That is, the bitmap contains the complete set of actual SS block positions of all other cells that need to notify.

For example, referring to FIG. 2, a network apparatus and a terminal operate in a frequency band of 3-6 GHz, and one SS burst set may transmit up to eight SS blocks. Based on the actual deployment requirement and specific implementation of the network, the numbers of SS blocks transmitted by different base station apparatuses are shown in FIG. 2.

For example, cell 1, cell 2, cell 3, and cell 4 are mutually neighboring cells, the SS block position actually transmitted by cell 1 is the first position of 8 candidate SS block positions, and cell 2 corresponds to the first and second positions; cell 3 corresponds to the second and fourth positions; and cell 4 corresponds to the first and third positions.

For cell 1, cell 2, cell 3 and cell 4 are neighboring cells, and cell 2, cell 3 and cell 4 use the first, second, third, and fourth SS block positions, when cell 1 uses a bitmap to notify the actual transmission position of the SS block of the neighboring cell of cell 1 to the UE served by cell 1, the bitmap is: "11110000", where "1" indicates that the SS block is transmitted at this candidate position, and "0" indicates that the SS block is not transmitted at this candidate position.

For cell 3, cell 1, cell 2 and cell 4 are neighboring cells, and cells 1, 2 and 4 use the first, second, and third SS block positions, when cell 3 uses a bitmap to notify the actual transmission position of the SS block of the neighboring cell of cell 3 to the UE served by cell 3, the bitmap is: "11100000", where "1" indicates that the SS block is transmitted at this candidate position, and "0" indicates that the SS block is not transmitted at this candidate position.

For cell 4, cell 1, cell 2 and cell 3 are neighboring cells, and cell 1, cell 2 and cell 3 use the first, second, and fourth SS block positions, when cell 4 uses a bitmap to notify the actual transmission position of the SS block of the neighboring cell of cell 4 to the UE served by cell 4, the bitmap is: "11010000", where "1" indicates that the SS block is transmitted at this candidate position, and "0" indicates that the SS block is not transmitted at this candidate position.

The network apparatus notifies the actual transmission position of the SS block of each of other cells to be measured in the form of one bitmap.

When the terminal performs measurement, if the local cell and the neighboring cell are synchronous, the terminal may determine the actual position of the SS block transmitted by the neighboring cell. The terminal directly acquires the actual position of the SS block of the neighboring cell based on the timing of the local cell.

Different from the foregoing synchronous situation, when there is a synchronous deviation between the local cell and the neighboring cell, the following manner may be adopted.

The measuring unit 62 is configured to, when there is a synchronous deviation between the at least one first type of cell and the cell managed by the network apparatus, acquire, the synchronous deviation between the at least one first type of cell and the cell managed by the network apparatus; and acquire, the bitmap corresponding to each of the first type of cell, and acquiring the transmission position of the synchronous signal block of each of the first type of cell based on the bitmap.

First of all, the network apparatus notifies the terminal of the synchronous deviation between other cell(s) and the local cell corresponding to the network apparatus. Correspondingly, when the terminal performs measurement, if the local cell and the neighboring cell are not synchronous, the terminal may determine the actual position of the SS block transmitted by the neighboring cell based on the notification information and the deviation of the timings between the cells. The terminal directly acquires the actual position of the SS block of the neighboring cell to be measured based on the timing of the local cell and the timing deviation of the neighboring cell to be measured.

For example, as shown in FIG. 3, cell 1 and cell 3 are synchronous, cell 2 is 0.5 ms backward offset from cell 1 and cell 3, then the first candidate SS block position of cell 2 corresponds to the second candidate SS block position of cell 1; and cell 4 is 1 ms backward offset from cell 1 and cell 3, so the first candidate SS block location of cell 4 corresponds to the third candidate SS block location of cell 1.

For example, cell 1 notifies the terminal of the time deviation between cell 2, cell 3, cell 4 and cell 1 respectively, the terminal combines the actual SS block transmission position of each of the cell 2, 3 and 4, and then the terminal may determine the reception time of actual transmission SS block of each cell.

In addition, the present embodiment may also provide a processing manner for a scenario in which a part of the neighboring cells is synchronous with the local cell and another part of the neighboring cells is not synchronous with the local cell:

if there is a synchronous deviation between a first part of the first type of cell in at least one first type of cell and the cell managed by the network apparatus, and a second part of the first type of cell in the first type of cell is in the synchronous state with the cell managed by the network apparatus; wherein, the first part of the first type of cell is different from the second part of the first type of cell, and the first part of the first type of cell and the second part of the first type of cell form all the first type of cell;

then acquiring the transmission position of the synchronous signal block of the first part of the first type of cell based on the bitmap of each first type of cell in the first part of the first type of cell;

and, acquiring, according to the bitmap of the second part of the first type of cell, the transmission position of the synchronous signal block of the second part of the first type of cell.

For example, in four neighboring cells, the synchronous relationship between the neighboring cells 1, 2 and the local cell is synchronous, and the neighboring cells 3 and 4 have a deviation; then, the transmission positions of the synchronous signal blocks of the neighboring cells 1 and 2 are all set in the bitmap and transmitted to the terminal apparatus; the synchronous deviation of the neighboring cells 3 and 4, and the bitmap of the transmission position of the synchronous signal block of the neighboring cell 3, and the bitmap of the transmission position of the synchronous signal block of the neighboring cell 4 are all transmitted to the terminal apparatus. Correspondingly, the terminal apparatus performs measurement on the neighboring cells 1 and 2 based on the bitmap of the transmission position of the synchronous signal block including the neighboring cell 1 and cell 2; and then, based on the synchronous deviation of the neighboring cells 3 and 4 and the respective bitmaps, perform the measurement at the transmission positions of the synchronous signal blocks of the neighboring cells 3 and 4 respectively.

There is also a processing manner in the present embodiment, that is, no matter whether there is a synchronous deviation between the neighboring cell and the local cell, the synchronous deviation of the neighboring cell and the bitmap of the transmission position of the synchronous signal block of the neighboring cell are transmitted to the terminal apparatus.

That is, the measuring unit 62 is configured to acquire the synchronous deviation between each of the at least one first type of cell and the cell managed by the network apparatus; acquire the bitmap corresponding to each of the first type of cell, and acquire the transmission position of the synchronous signal block of each of the first type of cell from the bitmap.

In this scenario, the synchronous deviation of the neighboring cell synchronized with the local cell is equal to 0.

Finally, it should be noted that, in this embodiment, the synchronous deviation of a certain neighboring cell and the bitmap corresponding to a certain neighboring cell may be sent simultaneously or sequentially, which is not limited herein.

It can be seen that by adopting the above scheme, the transmission position of the synchronous signal block of the neighboring cell can be transmitted to the terminal apparatus, thereby ensuring that the terminal apparatus can directly measure the neighboring cell at a moment corresponding to the notified transmission position of the synchronous signal block of the first type of cell, without performing measurement at other locations, thereby saving terminal measurement time and power consumption.

Figure 7:
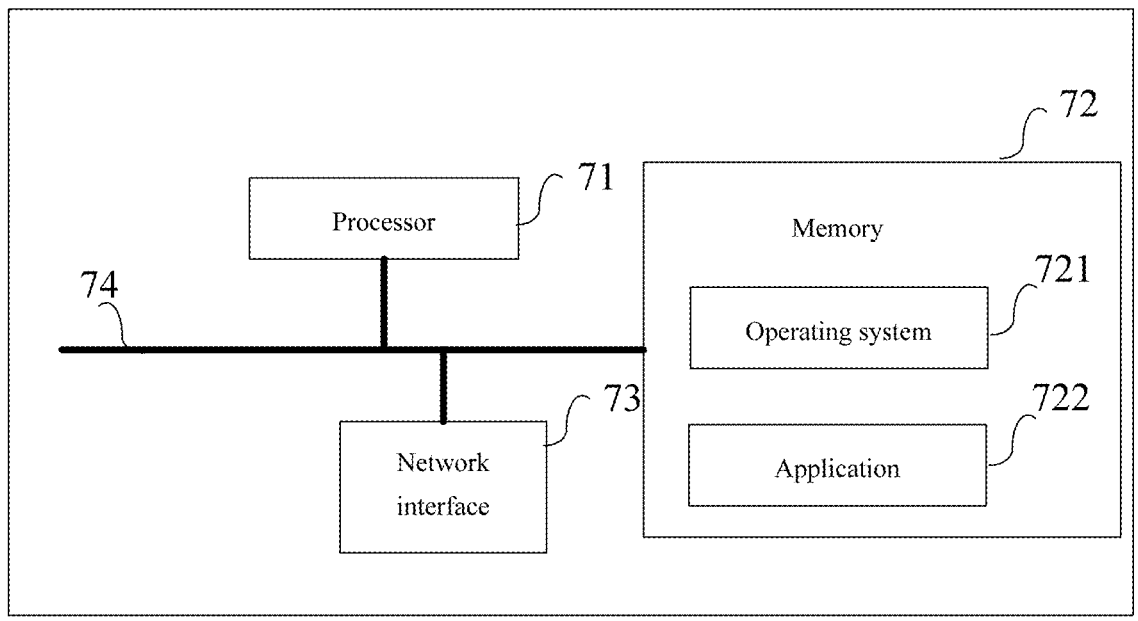
FIG. 7 is a schematic diagram showing a hardware architecture according to an embodiment of the present disclosure.

The embodiments of the present disclosure further provide a hardware composition of the network apparatus, as shown in FIG. 7, including: at least one processor 71, a memory 72, and at least one network interface 73. The components are coupled together through a bus system 74. It should be understood that the bus system 74 is used to implement connection communication between these components. The bus system 84 includes a power bus, a control bus, and a status signal bus expect for the data bus. However, for clarity of description, various buses are labeled as the bus system 74 in FIG. 7.

It should be understood that, the memory 72 in the embodiments of the present disclosure may be a volatile memory or a non-volatile memory, or may include both volatile memory and non-volatile memory.

In some embodiments, the memory 72 stores following elements, executable modules or data structures, or a subset thereof, or their extension set:
an operating system 721 and an application 722.

The processor 71 is configured to determine a transmission position of a synchronous signal block of at least one first type of cell; and transmit the transmission position of the synchronous signal block of at least one first type of cell to a terminal apparatus by a signaling; wherein, the terminal apparatus is located within a range of a second type of cell managed by the network apparatus. Further, the processor 71 may perform the method steps of the First Embodiment, and details are not elaborated herein.

A terminal apparatus in the embodiments of the present disclosure includes: a processor and a memory storing a computer program executable on the processor, wherein, when the computer programs are executed by the processor, the method steps of the second embodiment are implemented, and details are not elaborated herein.

The embodiments of the present disclosure provide a computer storage medium, storing computer executable instructions, when the computer executable instructions are executed, the method steps of the first embodiment or second embodiment are implemented.

The above apparatus of the embodiments of the present disclosure may also be stored in a computer-readable storage medium if being implemented in the form of a software functional unit and sold or used as an independent product. Based on such understanding, the essence of the technical solutions of the present application, or the part contributing to the related art or all or a part of the technical solutions, may be embodied in the form of a software product. The computer software product is stored in the storage medium including a number of instructions such that a computer device (which may be a personal computer, a server, or a network device, etc.) performs all or a part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like. Thus, the embodiments of the present disclosure are not limited to any specific combination of hardware and software.

Accordingly, the embodiments of the present disclosure further provide a computer storage medium, storing a computer program, and the computer program is configured to perform data scheduling method of embodiments of the present disclosure.

Although the preferred embodiments of the present disclosure have been disclosed for purpose of illustration, those skilled in the art will recognize that various modifications, additions and substitutions are possible, and the scope of the disclosure should not be limited to the embodiments described above.

What is claimed is:

1. A method for indicating a position of a synchronous signal block, applied to a network apparatus, comprising:
determining an actual transmission position of a synchronous signal block of at least one first type of cell; and
sending, by a signaling, the actual transmission position of the synchronous signal block of the at least one first type of cell to a terminal apparatus; wherein the terminal apparatus is located within a range of a second type of cell managed by the network apparatus, and the first type of cell is a neighboring cell of the second type of cell, and wherein the signaling is broadcast signaling or radio resource control (RRC) dedicated signaling;
wherein, the sending, by the signaling, the actual transmission position of the synchronous signal block of the at least one first type of cell to the terminal apparatus, comprises:
generating a bitmap based on the actual transmission position of the synchronous signal block of the at least one first type of cell, and sending the bitmap to the terminal apparatus by the signaling;
wherein the bitmap is used to notify the actual transmission position of the synchronous signal block of the neighboring cell;
wherein the bitmap comprises a plurality of bits, each bit corresponds to a candidate position of the synchronous signal block, a value of each bit is used to indicate whether the synchronous signal block is actually transmitted at the corresponding candidate position, and the number of the candidate positions is 8; and wherein each bit has a value of 1 or 0, wherein a value of 1 indicates that the synchronous signal block is transmitted at its corresponding candidate position, and a value of 0 indicates no synchronous signal block is transmitted at the corresponding candidate position.

2. The method according to claim 1, further comprising: sending, to the terminal apparatus, a synchronous relationship between the at least one first type of cell and a cell managed by the network apparatus;

wherein, the synchronous relationship comprises: a synchronous state between the first type of cell and the cell managed by the network apparatus; or, a synchronous deviation between the first type of cell and the cell managed by the network apparatus.

3. A method for indicating a position of a synchronous signal block, applied to a terminal apparatus, comprising:

receiving a signaling which indicates an actual transmission position of a synchronous signal block of at least one first type of cell from a network apparatus, wherein the terminal apparatus is located in a cell managed by the network device, and the first type of cell is a neighboring cell of the cell where the terminal apparatus is located, and wherein the signaling is broadcast signaling or radio resource control (RRC) dedicated signaling; and measuring the synchronous signal block of the at least one first type of cell based on the actual transmission position of the synchronous signal block of the at least one first type of cell;

wherein, the receiving the signaling which indicates the actual transmission position of the synchronous signal block of the at least one first type of cell from the network apparatus, comprises:

receiving a signaling from the network apparatus; and acquiring a bitmap from the signaling, and acquiring, by the bitmap, the actual transmission position of the synchronous signal block of the at least one first type of cell;

wherein the bitmap is used to notify the actual transmission position of the synchronous signal block of the neighboring cell;

wherein the bitmap comprises a plurality of bits, each bit corresponds to a candidate position of the synchronous signal block, a value of each bit is used to indicate whether the synchronous signal block is actually transmitted at the corresponding candidate position, and the number of the candidate positions is 8; and wherein each bit has a value of 1 or 0, wherein a value of 1 indicates that the synchronous signal block is transmitted at its corresponding candidate position, and a value of 0 indicates no synchronous signal block is transmitted at the corresponding candidate position.

4. The method according to claim 3, further comprising: receiving a synchronous relationship between the at least one first type of cell sent by the network apparatus and a cell managed by the network apparatus;

wherein, the synchronous relationship comprises: a synchronous state between the first type of cell and the cell managed by the network apparatus; or, a synchronous deviation between the first type of cell and the cell managed by the network apparatus.

5. A network apparatus, comprising: a processor, a memory for storing a computer program executable on the processor, and a network interface, wherein, when executing the computer program, the processor performs:

determining an actual transmission position of a synchronous signal block of at least one first type of cell; and sending, via the network interface, the actual transmission position of the synchronous signal block of the at least one first type of cell to a terminal apparatus by a signaling; wherein the terminal apparatus is located within a range of a second type of cell managed by the network apparatus, and the first type of cell is a neighboring cell of the second type of cell, and wherein the signaling is broadcast signaling or radio resource control (RRC) dedicated signaling;

wherein, the processor is further configured to generate a bitmap based on the actual transmission position of the synchronous signal block of the at least one first type of cell, and send the bitmap to the terminal apparatus by the signaling via the network interface, wherein the bitmap is used to notify the actual transmission position of the synchronous signal block of the neighboring cell;

wherein the bitmap comprises a plurality of bits, each bit corresponds to a candidate position of the synchronous signal block, a value of each bit is used to indicate whether the synchronous signal block is actually transmitted at the corresponding candidate position, and the number of the candidate positions is 8; and wherein each bit has a value of 1 or 0, wherein a value of 1 indicates that the synchronous signal block is transmitted at its corresponding candidate position, and a value of 0 indicates no synchronous signal block is transmitted at the corresponding candidate position.

6. The network apparatus according to claim 5, wherein, the processor is further configured to send, to the terminal apparatus, a synchronous relationship between the at least one first type of cell and the cell managed by the network apparatus via the network interface;

wherein, the synchronous relationship comprises: a synchronous state between the first type of cell and the cell managed by the network apparatus; or, a synchronous deviation between the first type of cell and the cell managed by the network apparatus.

7. The network apparatus according to claim 5, wherein, the processor is further configured to, when the at least one first type of cell is in a synchronous state with the cell managed by the network apparatus, generate the bitmap of the actual transmission position of the synchronous signal block comprising all the first type of cell based on the actual transmission position of the synchronous signal block of all the first type of cell; and send, by the signaling, the bitmap comprising the actual transmission position of the synchronous signal block of all the first type of cell to the terminal apparatus via the network interface.

8. The network apparatus according to claim 5, wherein, the processor is further configured to, when there is a synchronous deviation between the first type of cell and the cell managed by the network apparatus, send, to the terminal apparatus, the synchronous deviation between the at least one first type of cell and the cell managed by the network apparatus via the network interface; generate the bitmap corresponding to each of the first type of cell based on the actual transmission position of the synchronous signal block of the at least one first type of cell; and send, by the signaling, the bitmap corresponding to each of the first type of cell to the terminal apparatus via the network interface.

9. The network apparatus according to claim 5, wherein, the processor is further configured to, if there is a synchronous deviation between a first part of first type of cell in the at least one first type of cell and the cell managed by the network apparatus, and a second part of first type of cell in the first type of cell is in a synchronous state with the cell managed by the network apparatus; wherein, the first part of first type of cell is different from the second part of first type of cell, and the first part of first type of cell and the second part of first type of cell form all of the first type of cell;

then send, to the terminal apparatus, the synchronous deviation between the first part of first type of cell and the cell managed by the network apparatus via the network interface;

generate the bitmap corresponding to each of the first type of cell in the first part of first type of cell based on the actual transmission position of the synchronous signal block of the first part of first type of cell; and send, by the signaling, the bitmap corresponding to each of the first type of cell in the first type of cell to the terminal apparatus via the network interface;

and, generate, the bitmap comprising the actual transmission position of the synchronous signal block of the second part of first type of cell according to the actual transmission position of the synchronous signal block of the second part of first type of cell; and send, to the terminal apparatus, the bitmap comprising the actual transmission position of the synchronous signal block of the second part of the first type of cell by the signaling via the network interface.

10. The network apparatus according to claim 5, wherein, the processor is further configured to send, to the terminal apparatus, a synchronous deviation between each of the first type of cell in the at least one first type of cell and the cell managed by the network apparatus via the network interface; and generate the bitmap corresponding to each of the first type of cell based on the actual transmission position of the synchronous signal block of the first type of cell;

and send, by the signaling, the bitmap corresponding to each of the first type of cell to the terminal apparatus via the network interface.

11. A terminal apparatus, comprising: a processor, a memory for storing a computer program executable on the processor, and a network interface, wherein, when executing the computer program, the processor performs:

receiving, via the network interface, a signaling which indicates an actual transmission position of a synchronous signal block of at least one first type of cell from a network apparatus, wherein the terminal apparatus is located in a cell managed by the network device, and the first type of cell is a neighboring cell of the cell where the terminal apparatus is located, and wherein the signaling is broadcast signaling or radio resource control (RRC) dedicated signaling; and measuring the synchronous signal block of the at least one first type of cell based on the actual transmission position of the synchronous signal block of the at least one first type of cell, wherein, the processor is further configured to receive a signaling from the network apparatus via the network interface; and acquire a bitmap from the signaling, and acquire, by the bitmap, the actual transmission position of the synchronous signal block of at least one first type of cell;

wherein the bitmap is used to notify the actual transmission position of the synchronous signal block of the neighboring cell;

wherein the bitmap comprises a plurality of bits, each bit corresponds to a candidate position of the synchronous signal block, a value of each bit is used to indicate whether the synchronous signal block is actually transmitted at the corresponding candidate position, and the number of the candidate positions is 8; and wherein each bit has a value of 1 or 0, wherein a value of 1 indicates that the synchronous signal block is transmitted at its corresponding candidate position, and a value of 0 indicates no synchronous signal block is transmitted at the corresponding candidate position.

12. The terminal apparatus according to claim 11, wherein, the processor is further configured to receive a synchronous relationship between the at least one first type of cell sent by the network apparatus and a cell managed by the network apparatus via the network interface;

wherein, the synchronous relationship comprises: a synchronous state between the first type of cell and the cell managed by the network apparatus; or, a synchronous deviation between the first type of cell and the cell managed by the network apparatus.

13. The terminal apparatus according to claim 12, wherein, the processor is further configured to, when there is the synchronous deviation between the first type of cell and the cell managed by the network apparatus, acquire, from the bitmap, the actual transmission position of the synchronous signal block of all the first type of cell.

14. The terminal apparatus according to claim 12, wherein, the processor is further configured to, when there is the synchronous deviation between the first type of cell and the cell managed by the network apparatus, acquire, the synchronous deviation between the at least one first type of cell and the cell managed by the network apparatus; and acquire, the bitmap corresponding to each of the first type of cell, and acquire the actual transmission position of the synchronous signal block of each of the first type of cell based on the bitmap.

15. The terminal apparatus according to claim 12, wherein, the processor is further configured to, if there is the synchronous deviation between a first part of first type of cell in the at least one first type of cell and the cell managed by the network apparatus, and a second part of first type of cell in the first type of cell is in the synchronous state with the cell managed by the network apparatus; wherein, the first part of first type of cell is different from the second part of first type of cell, and the first part of first type of cell and the second part of first type of cell form all of the first type of cell;

then acquire the actual transmission position of the synchronous signal block of the first part of first type of cell based on the bitmap of each first type of cell in the first part of first type of cell;

and, acquire, according to the bitmap of the second part the first type of cell, the actual transmission position of the synchronous signal block of the second part of first type of cell.

16. The terminal apparatus according to claim 12, wherein, the processor is further configured to acquire the synchronous deviation between each first type of cell in the at least one first type of cell and the cell managed by the network apparatus; and acquire the bitmap corresponding to each of the first type of cell, and acquire the actual transmission position of the synchronous signal block of each of the first type of cell from the bitmap.

\* \* \* \* \*